Patented July 19, 1932

1,868,044

UNITED STATES PATENT OFFICE

LEOPOLD BRANDT, OF DORTMUND-HORDE, GERMANY, ASSIGNOR TO VEREINIGTE STAHLWERKE AKTIENGESELLSCHAFT, OF DUSSELDORF, GERMANY

METHOD OF PRODUCING IRONCARBONYL

No Drawing. Application filed September 5, 1929, Serial No. 390,649, and in Germany September 22, 1928.

It is already known to produce iron pentacarbonyl from iron and carbon oxide by making use of additions capable of accelerating the reaction. In the processes already known these catalyzers have been introduced into the gas phase either as gaseous or vapor like substances, such as steam or mercury vapor, or have been mixed with the basic element in the solid state. As solid catalyzers the oxides of aluminium, bismuth and nickel had been considered up to now which are of widely differing character, since the aluminium oxide, for example, in contradistinction to the other two oxides cannot be reduced to metal under the conditions of the test. Consequently, the action of these substances is entirely unknown and cannot be generalized.

It has been found that an addition of finely divided copper to the iron or, preferably, of a finely divided copper oxide to the iron oxide at room temperature resulted in a considerably increased yield of iron-carbonyl. Furthermore, it has been found that said addition of copper also considerably accelerates the reduction of the iron oxides and therefore facilitates the reduction particularly at low temperatures. Since it proved of particular advantage in the production of carbonyl at normal pressure to reduce the iron at a low temperature the new process, which is preferably practiced at a pressure exceeding but little the normal, say 0.1 atmosphere, is capable of considerably improving this method without the use of a high-pressure installation by accelerating the two reactions (the reduction and the production of carbonyl). In connection with the high-pressure method, the acceleration of the latter reaction is of particular importance.

It must be noted that, though the process is preferably practiced at room temperature, said temperature will be slowly raised during the process to about 120° C. in the course of the daily "drive-over" by a carbon monoxide current.

What I claim and desire to secure by Letters Patent of the United States is:

1. Process of producing iron carbonyl, comprising reducing iron compounds such as ores, mixing the metallic iron thus obtained with finely divided copper and causing carbon monoxide to act upon the mixture thus obtained for producing iron carbonyl.

2. Process of producing iron carbonyl, comprising reducing iron compounds such as ores, mixing the metallic iron thus obtained with finely divided copper and causing carbon monoxide to act upon the mixture thus obtained under normal pressure for producing iron carbonyl.

3. Process of producing iron carbonyl, comprising mixing oxidized iron compounds such as ores with a copper compound, reducing the mixture thus obtained and causing carbon monoxide to act upon the reduced mixture to produce iron carbonyl.

4. Process of producing iron carbonyl, comprising mixing oxidized iron compounds such as ores with a finely divided copper oxide, reducing the mixture thus obtained and causing carbon monoxide to act upon the reduced mixture to produce iron carbonyl.

LEOPOLD BRANDT.